Sept. 13, 1966  J. H. ANDRESEN, JR  3,272,608
PRESSURE-ACTUATED VALVE FOR USE IN AIRCRAFT
Filed March 12, 1964
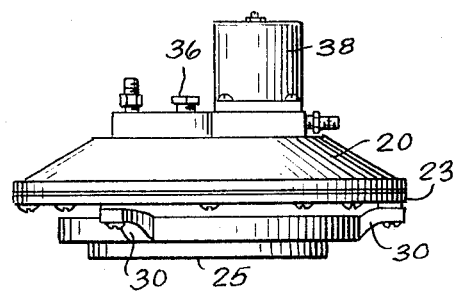
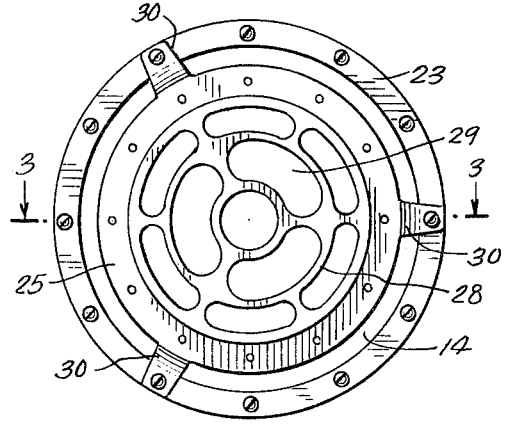
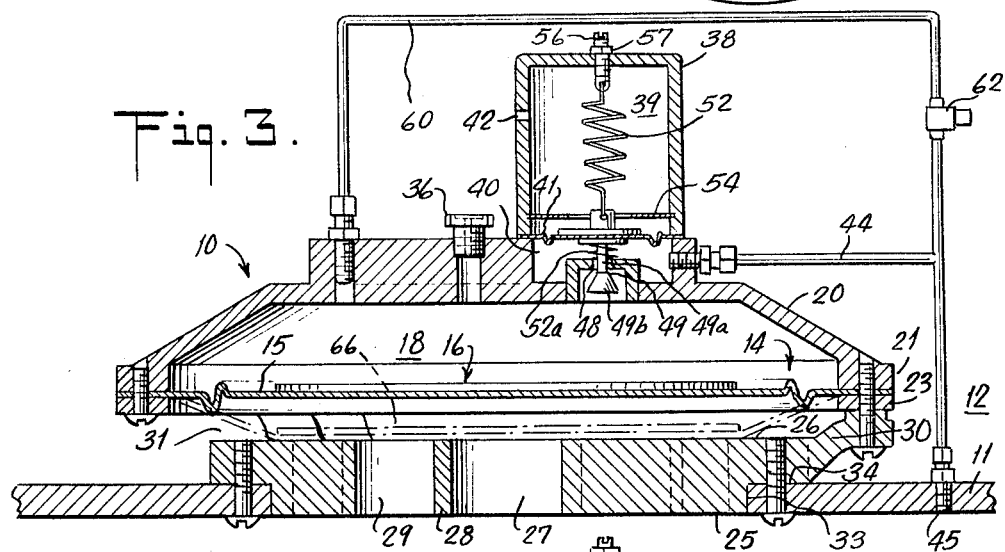
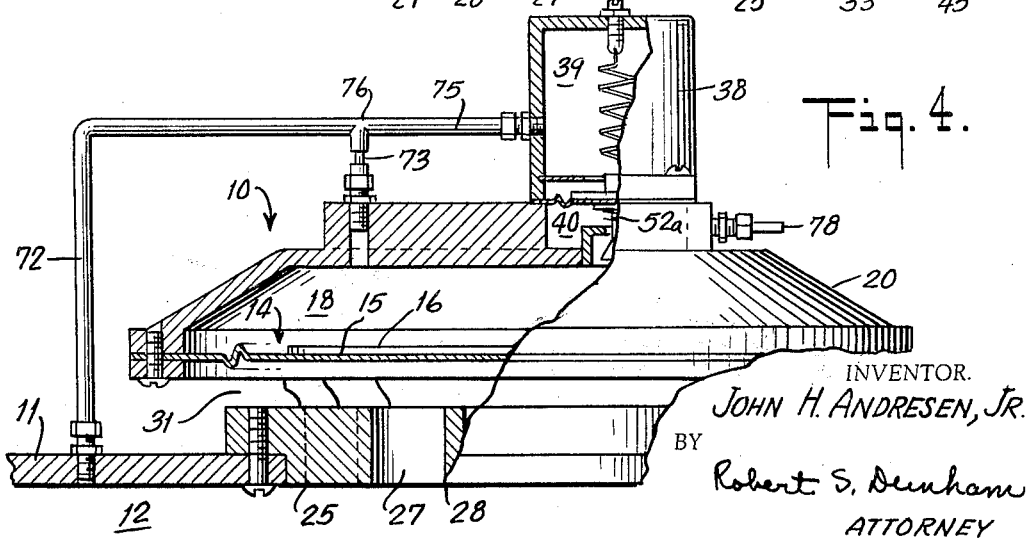
INVENTOR.
JOHN H. ANDRESEN, JR.
BY Robert S. Denham
ATTORNEY

United States Patent Office 3,272,608
Patented Sept. 13, 1966

3,272,608
PRESSURE-ACTUATED VALVE FOR USE
IN AIRCRAFT
John H. Andresen, Jr., Hewitt, N.J., assignor to Intercontinental Dynamics Corporation, Englewood, N.J., a corporation of New York
Filed Mar. 12, 1964, Ser. No. 351,380
5 Claims. (Cl. 98—1.5)

This invention relates to fluid-pressure-actuated valves for controlling fluid flow, and particularly to pneumatically-operated valves for regulating fluid pressure (e.g. air pressure) in a confined region by control of fluid flow between such region and a locality external thereto. In a specific aspect, the invention is directed to safety valves for pressurized aircraft cabins.

Pneumatically operated pressure control and safety valves are commonly employed in aircraft cabins, and especially in aircraft cabins which are adapted to be pressurized, to regulate or relieve pressure conditions therein. For example, in a pressurized cabin it is desirable to provide safety valve means affording controlled communication between the cabin interior and the exterior, for effecting release of cabin air (and concomitant reduction in cabin pressure) whenever the cabin-outside pressure differential increases beyond a pre-determined limit, to prevent development of an excessive pressure differential such as might cause structural damage to the aircraft. It is further desirable to provide valve means for admitting outside air to the cabin to equalize cabin and outside pressures whenever outside pressure exceeds cabin pressure (creating a so-called negative pressure differential), because aircraft cabin structures are not ordinarily designed to withstand negative pressure differentials. The same or similar valve means may also be arranged to effect rapid cabin depressurization at desired times by release of cabin air to equalize the cabin and outside pressures. Again, a cabin-venting valve may be used to regulate the absolute pressure in the cabin by effecting controlled release of cabin air responsive to variations in absolute cabin pressure.

Valves heretofore employed for purposes such as the foregoing have commonly been characterized by various disadvantages, particularly with respect to economy and convenience of construction and reliability of performance. In such valves, which conventionally have metal or like rigid, comparatively massive (and commonly spring-biased) valve heads, provision of air-tight valve closure initially requires careful machining of the valve faces to very close tolerances, and often also necessitates inconvenient attention in service, since the accumulation of even minor amounts of foreign matter on the valve faces may impair or prevent the desired closure. Furthermore, a relatively massive, spring-biased valve head is susceptible to vibration, which also interferes with air-tight closure. Other disadvantages inhere in the use of valve bearings, as required by the design of these conventional valve structures; the bearings impart a frictional load and may corrode or even cause sticking of the valve.

An object of the present invention is to provide a pressure-responsive flow control valve which is simple and economical in construction, relatively light in weight, and advantageously sensitive and reliable in operation. Another object is to provide a valve construction of such type in which assured gas-tight valve closure is achieved without the necessity of closely machining the valve faces, and in which the desired closure is not impeded by the presence of foreign matter on the valve faces. A further object is to provide such a valve having a freely suspended (non-spring-biased) valve head which is of low mass (and hence not readily susceptible to vibration) and which requires no valve bearings thereby obviating the problems of frictional loading and sticking associated with such bearings.

Still another object is to provide a valve of the foregoing character adapted to be employed as a pressure control valve for regulation of air pressure in a confined locality such as a pressurized aircraft cabin. A still further object is to provide such a valve adapted for use as a safety valve for pressurized aircraft cabins both to maintain the cabin-outside pressure differential below a predetermined upper limit and to equalize cabin and outside pressures whenever the latter exceeds the former. Another object is to provide an aircraft cabin valve of the last-mentioned type which is further arranged to effect rapid cabin depressurization when desired.

Further objects and advantages of the invention will be apparent from the detailed description hereinbelow setforth, together with the accompanying drawings, wherein:

FIG. 1 is an elevational view of a valve structure embodying the present invention;

FIG. 2 is a plan view of the valve of FIG. 1;

FIG. 3 is an enlarged sectional view of the valve of FIG. 1, taken along the line 3—3 of FIG. 2; and FIG. 4 is a sectional view of an alternative embodiment of the invention.

Referring first to FIGS. 1–3, the embodiment of the invention there illustrated is adapted for use as a safety valve for a pressurized aircraft cabin. It broadly comprises a valve unit 10 arranged to be mounted in an aircraft cabin wall 11 (as shown in FIG. 3) to provide controlled communication between the cabin interior 12 and the external ambient atmosphere for relief of various pressure conditions, as hereinafter described.

In this valve, the movable valve element is a flexible diaphragm 14 comprising a thin, convoluted, fabric-reinforced rubber membrane 15 and a centrally disposed, relatively thick, flat disk 16 which serves as the valve head; as shown, the disk 16 may comprise the central portion of the membrane 15, having a disk-shaped flat rubber body secured to its inner surface to provide additional thickness. This diaphragm is mounted to constitute one wall of a closed chamber 18 (of shallow frusto-conic configuration) defined by a housing 20. As shown, the periphery of the diaphragm is held against an annular flange portion 21 of the housing 20 by a ring 23, which is secured to the flange 21 through the edge of the diaphragm. The diaphragm 14 is not otherwise connected to any structural elements, and being thus suspended across the chamber 18 the rubber disk 16 is freely displaceable toward and away from the chamber responsive to variations in the differential between air pressures acting on opposite surfaces of the diaphragm.

The valve structure further includes a generally disk-shaped valve port member 25, having an annular shoulder or rim portion 26 defining a circular valve port 27 (smaller in diameter than the rubber disk 16), and further having portions forming a rigid grill 28 extending across the valve port. As shown in FIG. 2, this member 25 may be a unitary metal body having a plurality of closely adjacent openings 29 arranged within a central circular area to constitute the valve port 27; the body portions separating the openings 29 then constitute the grill 28.

The member 25 is secured to the ring 23 and housing 20, in fixed position facing the surface of the diaphragm 14 opposite to the chamber 18, by a plurality of struts 30. These struts are integral with and spaced around the periphery of the rim 26, and extend upwardly and outwardly therefrom to the ring 23 to which they are fixedly secured. As thus mounted, the member 25 is disposed in spaced relation to the latter ring; the valve port 27 is aligned with the diaphragm disk 16 and the rim 26 lies in a plane substantially parallel to and spaced from the plane of the periphery of the diaphragm. An annular space or opening is thereby provided between the diaphragm periphery and the valve port rim 26; this opening constitutes a passage 31 through which air can flow, i.e. between the diaphragm 14 and member 25, to or from the valve port 27, when the valve port is open.

In this arrangement of elements, closure of the valve port 27 is effected by the diaphragm disk 16. Specifically, when the disk 16 is displaced sufficiently (in a direction away from the chamber 18) it engages the valve port rim 26 and grill 28; the surfaces of the rim and grill facing the diaphragm are substantially in a single plane such that the disk 16 seats firmly against these surfaces to fully close the valve port.

The valve unit 10 comprising the foregoing structures is adapted to be mounted on the inner surface of the aircraft cabin wall 11, with the valve port member 25 seating in a circular port or opening 33 in the wall so that the valve port 27 opens to the outside. Accordingly, the periphery of the member 25 is shaped to form a flange 34 adapted to engage the edge of the cabin wall opening 33 to provide an air-tight joint between the valve and wall; the outer surface of the member 25 projects beyond the flange 34 so as to be substantially flush with the exterior of the cabin wall. With the valve thus mounted, the passage 31 between the diaphragm periphery and the member 25 communicates with the cabin interior, so that air can flow from the cabin to the outside through the passage 31 and thence through the port 27.

Displacemnt of the diaphragm 14 to close or open the valve port is, as previously stated, effected by variation in the differential between air pressures acting on opposite surfaces of the diaphragm. When the valve is mounted as described above, air pressure on the outer surface of the diaphragm is provided by cabin pressure (communicated through the passage 31) and outside pressure (communicated through the valve port 27). Air pressure on the inner diaphragm surface is provided by the pressure in the chamber 18, which constitutes a reference chamber for control of operation of the valve.

This chamber 18 communicates with the interior of the cabin through an air filter and metering orifice 36, e.g. of conventional design, adapted to admit cabin air to the chamber 18 at a restricted rate. Controlled communication between the chamber 18 and the ambient outside air is also provided, by means of a pilot valve 38 mounted on a wall of the housing 20; this pilot valve is normally closed and is adapted to vent the chamber 18 to the outside when the cabin-outside pressure differential exceeds a predetermined limit.

One example of a suitable pilot valve is shown in FIG. 3. This pilot valve has two chambers 39 and 40 separated by a flexible diaphragm 41. Chamber 39 opens to the cabin interior through an orifice 42; chamber 40 opens to the outside air through a static line 44 leading to a static orifice 45 in the aircraft wall. The chamber 40 also communicates with the main reference chamber 18 of the valve 10, through an orifice 48 (substantially larger than the metering orifice 36) which is controlled by a valve element 49 carried by the diaphragm 41. This element 49 comprises a pin or rod 49a extending from the diaphragm through the orifice 48 and terminating in a valve head 49b on the side of the orifice away from the chamber 40. The diaphragm 41 is biased by a calibration spring 52 (under tension) and safety spring 52a (under compression) which hold the valve element 49 in position closing the orifice 48. A stop ring 54 limits upward displacement of the diaphragm 41 into the chamber 39.

When the cabin pressure (in chamber 39) exceeds the outside pressure (in chamber 40) by an amount sufficient to overcome the bias of springs 52 and 52a, the pressure differential across the diaphragm 41 displaces the latter toward chamber 40 so that the valve head 49a moves away from closed position, opening the orifice 48 and thereby venting the reference chamber 18 to the outside through the orifice 48. The pressure differential at which the valve thus opens is preselected by adjustment of the spring 52, e.g. by means of a settable screw 56 held by a locknut 57.

The chamber 18 can also be vented directly to the outside through a static line 60 connected to the static orifice 45 and controlled by a normally closed cock 62 (e.g. a manually operable cock positioned for operation by the pilot of the aircraft). It may be explained that the static orifice 45 should be separate from the main static ports of the aircraft, since connection of the lines 44 and 60 to the pilot's or copilot's static systems would tend to cause flight instrument errors. The static source for the valve 10 need not be as free from error as the main static ports, although any such error will cause a corresponding error in the pressure differential at which the pilot valve 38 is set to open; in the latter case the pilot valve may be reset to allow for this error, if known. Indeed, if ambient outside pressure in the vicinity of the valve port 27 is close to true static pressure, the static port 45 may be provided in the valve port member 25 (with suitable static line to the pilot valve included in the valve unit 10), obviating the need for plumbing or installation of conduit lines external to the valve unit, i.e. unless it is desired to provide a control line 60 to the pilot's cabin or other control locality.

The operation of the valve of FIGS. 1–3 may now be readily understood. When cabin and outside pressures are substantially equal, i.e. when the aircraft cabin is not pressurized, the valve 10 is open, providing free communication through the port 27 between the interior of the cabin and the exterior. The diaphragm 14 assumes a substantially flat position as shown in FIG. 3, spaced away from the valve port rim 26. The pilot valve 38 is closed, and pressure in the chamber 18 is equal to cabin (and ambient) pressure as communicated through the metering orifice 36.

When cabin pressurization is started, by continuous pumping of air into the cabin (e.g. using conventional compressor means, not shown) to establish a cabin pressure higher than outside pressure, air flows from the cabin through passage 31 and thence through port 27 to the outside; the Bernoulli effect of this air flow reduces the pressure on the outer surface of the diaphragm periphery. At the same time, cabin air slowly bleeds into the reference chamber 18 through the metering orifice 36, causing a gradual increase in pressure in the chamber 18, relative to ambient outside pressure. This increasing pressure in the chamber 18 acts across the total area of the inner surface of the diaphragm 14, while the central portion of the outer diaphragm surface is exposed to the lower outside pressure through the port 27. As a result, an increasing pressure differential develops across the diaphragm 14, slowly displacing the diaphragm toward the valve port, until finally the thickened diaphragm portion or disk 16 is forced against the rim 26 and grill 28 (as indicated by dotted line 66 in FIG. 3), closing the port 27 and preventing further outflow of cabin air. The slow closing of the valve prevents unduly rapid buildup of pressure in the cabin; after the valve is closed, cabin pressure increases to the desired value as the compressor continues to pump air into the cabin.

Thereafter the valve 10 remains tightly closed under normal pressurized-cabin conditions, i.e. as long as the cabin-outside pressure differential remains below the value for which the pilot valve 38 is set. The difference between the pressure in the chamber 18 (equal to cabin pressure) and the outside pressure communicated through the port 27 holds the disk 16 firmly against the grill 28, which supports the disk in this position. There is substantially no pressure differential across the thin peripheral portion of the diaphragm, since this periphery is exposed on one side to the cabin pressure in chamber 18 and on the other side to cabin pressure communicated through the passage 31.

If, however, the cabin-outside pressure differential exceeds the predetermined limit for which the pilot valve calibration spring 52 is set, the pilot valve 38 opens in the manner previously described, venting the chamber 18 to the outside through orifice 48. Since air can escape through the latter orifice to the static line 44 more rapidly than it can flow into the chamber 18 through the metering orifice 36, the pressure in the chamber 18 then drops to a value close to static pressure. As the chamber pressure thus falls, the higher cabin pressure, communicated to the outer surface of the periphery of the diaphragm 14 through the passage 31, forces the diaphragm away from the valve port 27, opening the port to enable cabin air to escape therethrough to reduce cabin pressure. In this way the valve 10 acts to maintain the cabin-outside pressure differential below the aforementioned limit, which is preferably somewhat lower than the value which might cause structural damage to the aircraft. After the pressure differential has been sufficiently reduced, the pilot valve recloses (due to the biasing action of spring 52) sufficiently to cause a pressure in chamber 18 which allows the disk 16 to remain open (i.e. displaced from fully-closed position) just sufficiently to maintain cabin pressure at the maximum allowable value relative to ambient outside pressure. Should conditions of cabin airflow or flight altitude change so that a tendency toward excessive pressure differential no longer exists, the valve recloses.

Under some circumstances, as in the event of rapid descent of the aircraft, the outside pressure may become greater than cabin pressure, creating a negative pressure differential. In such cases, the higher outside pressure acting against the diaphragm disk 16 through port 27 rapidly forces the disk away from engagement with the valve port rim and grill, i.e. upwardly into the chamber 18 (incidentally forcing air in the chamber out through the metering orifice 36). Such opening of the valve port enables outside air to enter the cabin through the passage 31 to elevate cabin pressure to a value close to ambient outside pressure.

As stated, in the operation of the valve as described above the manually operable cock 62 is closed. At any desired time when the cabin is pressurized, however, the valve 10 may be opened to depressurize the cabin by opening the cock 62 so as to vent the chamber 18 to the outside through static line 60. This rapidly reduces the pressure in the chamber 18 with the result that cabin pressure acting on the periphery of the diaphragm 14 through passage 31 lifts the diaphragm away from the port rim and grill, opening the valve port 27 to release cabin air. If desired, the rate of depressurization may be controlled by opening the cock 62 only partially, and repressurization may be effected by reclosing the cock and resuming pumping of air to the cabin.

In the foregoing valve structure, use of the flexible diaphragm 14 as the valve head obviates the necessity of providing a closely machined valve seat, since the pressure differential acting across the diaphragm holds the diaphragm firmly against the rim 26 and grill 28 to afford assured air-tight closure even if minor surface irregularities or deposits of foreign matter are present on the rim and grill; i.e. the flexible diaphragm can undergo minor local deformation to accommodate these irregularities without impairment of closure. At the same time, the low mass and free suspension of the diaphragm minimize the possibility of vibration which might partially open the valve. Thus, in particular, the present valve provides valve action of high sensitivity and reliability with a simple and economical construction. Provision of a thickened (yet relatively flexible) central disk portion 16 for the diaphragm, and provision of the grill 28 to support the diaphragm in closed position, afford important advantages for the attainment of firm closure and in preventing undue deformation of the diaphragm when closed, such as might cause structural damage to the diaphragm.

The valve of FIGS. 1-3 is capable of various modifications. For example, a valve of the type shown may be provided with other or different pilot valves for control of pressure in the reference chamber 18 to enable use of the valve 10 to effect complete cabin pressure control, e.g. through controlled release of air from the cabin as necessary to maintain a desired absolute cabin pressure. Suitable arrangements of pilot valves providing this function will be readily apparent to those skilled in the art.

By way of further illustration, a valve generally as described above may be arranged so that the central portion of the diaphragm (disk 16) is exposed on its outer surface to cabin pressure, and the peripheral portion of the outer diaphragm surface is exposed to outside pressure; i.e. the forces or pressures acting on the outer diaphragm surface may be reversed.

Such an arrangement is shown in FIG. 4. The valve 10 in FIG. 4 is generally similar in structure and operation to that of FIG. 1, including the diaphragm 14 (having a central disk portion 16), housing 20 defining the reference chamber 18, valve port member 25 defining the valve port 27, and pilot valve 38 for controlling reference chamber pressure. In this figure, the static line 60 with cock 62 for manual control is omitted. The valve of FIG. 4 is secured, however, on the outer side of the cabin wall 11, so that the valve port 27 communicates with the cabin and the passage 31 communicates with the outside air. Cabin pressure is communicated to the reference chamber 18 by means illustrated schematically as a conduit 72 which has a restricted portion 73 (corresponding to the metering orifice 36 of the valve of FIG. 3) to permit flow of cabin air into the chamber 18 at a restricted rate. Cabin air is also supplied to the chamber 39 of the pilot valve 38, as by a further conduit 75 extending from a T 76 in the conduit 72 upstream of the restricted portion 73. The chamber 40 of the pilot valve opens directly to ambient outside air through an orifice 78. Thus, although cabin pressure acts on the central portion of the outer diaphragm surface through the valve port, and outside pressure acts on the diaphragm periphery through the passage 31, the pressure in the reference chamber 18 is controlled in the same way as in the arrangement of FIG. 3. The operation of this valve for positive and negative pressure relief is as described above for the valve of FIGS. 1-3, although the disposition of the pressures on the outer diaphragm surface is reversed, as shown.

In the foregoing valve structures, as stated above, the disk portion 16 is spaced away from the valve port rim 26 and grill 28 when there is no pressure differential acting across the diaphragm 14, and thus these valves may be described as normally open (i.e. when ambient and cabin pressures are equal). However, in some instances it may be desirable that the disk portion 16 rest against the valve port rim and grill in the absence of pressure differential across the diaphragm, providing a valve which may be described as normally closed. To this end, the valve port member 25 may be so positioned that the plane of the rim 26 substantially coincides with the plane of the diaphragm periphery; the annular passage 31, defined between the ring 23 and the periphery of the member 25 (which is smaller in diameter than the ring), is then coplanar with the rim. In the latter case, the operation of the valve is as described above for the valves of FIGS. 3 and 4; when the diaphragm disk is displaced away from the grill as the result of development of an excessive cabin-outside pressure differential or a negative pressure differential, air flows through the passage 31 to or from the valve port 27.

It is to be understood that the invention is not limited to the specific features and embodiments hereinabove set forth, but may be carried out in other ways without departure from its spirit.

I claim:
1. A safety valve for relief of air pressure in a confined locality responsive to variations in the difference between said pressure and the pressure at a locality external thereto, comprising, in combination, a housing defining a closed chamber; a flexible diaphragm peripherally secured to said housing to form one wall of said chamber, in such manner that the entire inner surface of said diaphragm is exposed to air pressure in said chamber, said diaphragm having a thickened central portion freely displaceable toward and away from said chamber in response to variations in pressure differential between air pressures acting on opposite surfaces of said diaphragm; means for admitting air from said confined locality to said chamber at a restricted rate; means for venting said chamber, to reduce the air pressure therein, responsive to increase in the difference between the pressure in said confined locality and the pressure in said external locality above a predetermined limit; manually controllable means for venting said chamber to said external locality; and means defining a valve port adapted to communicate with a first one of said localities and having a rim and further providing a rigid grill extending across said valve port, disposed on the side of said diaphragm opposite to said chamber with said rim positioned, in fixed spaced relation to the periphery of said diaphragm, to be engaged by said thickened portion of said diaphragm for closure of said valve port when said diaphragm is displaced away from said chamber, and to define a passage for air flow between said rim and said diaphragm periphery, said grill providing support for said diaphragm when said diaphragm engages said rim; said passage being adapted to communicate with the second of said localities, such that separate regions of the outer surface of said diaphragm are individually exposed to air pressures in said first and second localities through said port and said passage respectively, whereby said diaphragm is displaced away from said rim when either of said last-mentioned pressures exceeds the pressure in said chamber and is displaced toward said rim whenever the pressure in said chamber exceeds the pressure in one of said localities and is not less than the pressure in the other of said localities.

2. For use in an aircraft having a cabin and means for pressurizing said cabin, a safety valve for relief of cabin pressure responsive to variations in the difference between said cabin pressure and ambient external air pressure, said valve comprising: a housing defining a closed chamber; a flexible diaphragm peripherally secured to said housing to form one wall of said chamber, in such manner that the entire inner surface of said diaphragm is exposed to air pressure in said chamber, said diaphragm having a thickened central portion freely displaceable toward and away from said chamber in response to variations in pressure differential between air pressures acting on opposite surfaces of said diaphragm; means for admitting air from said cabin to said chamber at a restricted rate; structure defining an air space communicating with the exterior of said cabin and including a movable wall for said air space having opposite sides respectively acted on by ambient external pressure in said air space and by cabin pressure such that said movable wall tends to be displaced in a given direction when cabin pressure exceeds external pressure; means defining an opening through said housing between said chamber and said air space, said opening and air space providing a path for air flow from said chamber to the exterior of said cabin; valve means operatively connected to said movable wall for controlling air flow through said opening, positioned and adapted to maintain said opening normally closed and to permit air flow therethrough, for venting said chamber to reduce the air pressure therein, upon displacement of said movable wall in said given direction; biasing means for restraining said movable wall against displacement in said given direction, adapted to permit displacement of said wall in said given direction, for venting said chamber as aforesaid, if and only if the difference between cabin pressure and ambient external pressure exceeds a predetermined limit; and means defining a valve port having a rim and providing a rigid grill extending across said valve port, disposed on the side of said diaphragm opposite to said chamber with said rim positioned, in fixed spaced relation to the periphery of said diaphragm, to be engaged by said thickened portion of said diaphragm for closure of said valve port when said diaphragm is displaced away from said chamber, and to define a passage for fluid flow between said rim and said diaphragm periphery, said grill providing support for said diaphragm when said diaphragm engages said rim; said valve being adapted to be mounted in a wall of said cabin with said valve port communicating with the exterior of said cabin and said passage communicating with the interior of said cabin, such that the central portion of the outer surface of said diaphragm is exposed to external ambient pressure communicated through said valve port and the peripheral portion of said outer diaphragm surface is exposed to cabin pressure communicated through said passage, whereby said diaphragm is displaced away from said rim when either of said last-mentioned pressures exceeds the pressure in said chamber and is displaced toward said rim whenever the pressure in said chamber exceeds ambient outside pressure and is not substantially less than cabin pressure.

3. A safety valve as defined in claim 2, including conduit means connecting said air space to the exterior of said cabin, and wherein said opening, said air space, and said conduit means together provide a path for air flow from said chamber to the exterior of said cabin at a rate greater than said restricted rate at which air is admitted to said chamber from said cabin by said air-admitting means.

4. A safety valve as defined in claim 2, including conduit means communicating with said chamber and the exterior of said cabin to provide a second path for air flow therebetween, and means for controlling air flow through said conduit means to selectively prevent and effect venting of said chamber to reduce the air pressure therein, through said conduit means.

5. A safety valve as defined in claim 2, wherein said biasing means comprises a resilient member operatively connected to said movable wall and includes means for adjusting the biasing force exerted by said member on said movable wall to vary the limit of pressure differential at which said biasing means permits displacement of said movable wall in said given direction.

References Cited by the Examiner
UNITED STATES PATENTS

| | | | |
|---|---|---|---|
| 2,578,026 | 12/1951 | Taylor | 98—1.5 |
| 2,590,330 | 3/1952 | Krueger | 98—1.5 |
| 2,737,873 | 3/1956 | Bell | 98—1.5 |

MEYER PERLIN, *Primary Examiner.*